United States Patent [19]

Sakai

[11] Patent Number: 5,487,105
[45] Date of Patent: Jan. 23, 1996

[54] FACSIMILE APPARATUS OPERABLE IN FACSIMILE OR TELEPHONE MODE

[75] Inventor: Hajime Sakai, Oonojo, Japan

[73] Assignee: Matsushita Electric Industrial Co., Ltd., Osaka, Japan

[21] Appl. No.: 169,901

[22] Filed: Dec. 20, 1993

[30] Foreign Application Priority Data

Dec. 21, 1992 [JP] Japan .................................... 4-340017
Dec. 21, 1992 [JP] Japan .................................... 4-340018
Dec. 21, 1992 [JP] Japan .................................... 4-340020

[51] Int. Cl.⁶ .......................... H04M 11/00; H04M 1/64
[52] U.S. Cl. .............................. 379/100; 379/88; 379/89
[58] Field of Search .............................. 379/100, 93, 96, 379/97, 98, 67, 88, 89, 80; 358/400, 468

[56] References Cited

U.S. PATENT DOCUMENTS

| | | | |
|---|---|---|---|
| 4,800,439 | 1/1989 | Yoshino | 379/100 |
| 4,868,865 | 9/1989 | Ogawa et al. | 379/100 |
| 4,916,607 | 4/1990 | Teraichi et al. | 519/98 |
| 4,939,772 | 7/1990 | Goto | 379/80 |
| 5,014,296 | 5/1991 | Saigano | 379/100 |

FOREIGN PATENT DOCUMENTS

| | | | |
|---|---|---|---|
| 63-211960 | 9/1988 | Japan | 379/100 |
| 6451861 | 2/1989 | Japan | 379/100 |
| 360565 | 3/1991 | Japan | 379/100 |
| 3179857 | 8/1991 | Japan | 379/100 |

*Primary Examiner*—Jason Chan
*Attorney, Agent, or Firm*—Lowe, Price, LeBlanc & Becker

[57] ABSTRACT

A facsimile apparatus is operable in a facsimile mode, a telephone conversation mode or an automatic telephone answering/recording mode when a presence operation mode is set. When a CNG signal is received within a first given time, the facsimile mode is selected. On the other hand, when no CNG signal is received within the first given time and a telephone handset is off-hooked within a second given time, the telephone conversation mode is selected. When no CNG signal is received within the first given time and the telephone handset is not off-hooked within the second given time, the automatic telephone answering/recording mode is selected. Further, when no voice signal is received within a third given time during the automatic telephone answering/recording mode being selected, the facsimile mode is selected. It may be arranged that, when no CNG signal is received within the first given time and the telephone handset is not off-hooked within the second given time, one of the automatic telephone answering/recording mode and the facsimile mode is selected depending on whether the voice signal is received or not.

23 Claims, 9 Drawing Sheets

5,487,105

1

FACSIMILE APPARATUS OPERABLE IN FACSIMILE OR TELEPHONE MODE

BACKGROUND OF THE INVENTION

1. Field of the Invention

The present invention relates to a facsimile apparatus having facsimile and telephone functions, which is operable in a facsimile mode or a telephone mode.

2. Description of the Prior Art

Facsimile apparatuses having facsimile and telephone functions have been known as disclosed, such as, in Japanese First (unexamined) Patent Publication No. 63-211960.

FIG. 7 is a block diagram showing a schematic structure of one of the conventional facsimile apparatuses having the facsimile and telephone functions. FIG. 8 is a flowchart of a control routine to be executed in a presence operation mode for performing selection between a facsimile mode and a conversation mode, and FIG. 9 is a flowchart of a control routine to be executed in an absence operation mode for performing selection between a facsimile mode and an automatic answering/recording mode.

In FIG. 8, at a first step 10, a controller 3 determines whether a ring signal from a calling party is received through a telephone line 1, based on a detection signal from a ring signal detection circuit 2. When the ring signal is detected, the routine proceeds to a step 11 where the controller 3 controls the interface circuit 4 to close the telephone line 1. When the telephone line 1 is closed, a facsimile communication start signal (hereinafter referred to as "CNG signal") is transmitted from the caller facsimile apparatus when the caller facsimile apparatus is operated under an automatic calling mode. A subsequent step 12 determines based on a detection signal from a CNG signal detection circuit 5 whether the CNG signal is detected within a predetermined time T1 (for example, about 4 seconds). When the CNG signal is detected at the step 12, the routine proceeds to a step 13 where the controller 3 selects the facsimile mode by switching a switching circuit 6 to a facsimile communication circuit 7 to connect the facsimile communication circuit 7 to the telephone line 1 so that a facsimile communication can be performed with the caller facsimile apparatus.

On the other hand, when no CNG signal is detected at the step 12, the routine proceeds to a step 14 which determines whether a telephone handset is off-hooked within a predetermined time T2. The predetermined time T2 is determined so as to allow a speaker to produce a ringing tone, for example, three to six times. When the handset is off-hooked at the step 14, the routine proceeds to a step 15 where the controller 3 selects a conversation mode by switching the switching circuit 6 to a telephone communication circuit 8 for connection to the telephone line 1 so that the conversation can be performed between the calling and called parties. On the other hand, when the step 14 determines that the handset is not off-hooked within the predetermined time T2, the routine proceeds to a step 16 where the controller 3 selects the facsimile mode by switching the switching circuit 6 to connect the facsimile communication circuit 7 to the telephone line 1 so that the facsimile communication can be performed with the caller facsimile apparatus.

The steps 14 and 16 are provided for the following reason:

When the caller facsimile apparatus is operated under the automatic calling mode, the CNG signal is immediately transmitted through the telephone line 1. On the other hand, when the caller facsimile apparatus is operated under a manual calling mode, there is such a facsimile apparatus that produces no CNG signal. Accordingly, even when no CNG signal is detected at the step 12, there is a possibility that the caller wishes the facsimile communication.

Now, referring to FIG. 9, the control routine to be executed during the absence operation mode will be explained. In FIG. 9, at a first step 20, the controller 3 determines whether the ring signal from the caller is received through the telephone line 1, based on the detection signal from the ring signal detection circuit 2. When the ring signal is detected, the routine proceeds to a step 21 where the controller 3 controls the interface circuit 4 so as to close the telephone line 1. Subsequently, a step 22 determines based on the detection signal from the CNG signal detection circuit 5 whether the CNG signal is detected within the predetermined time T1. When the CNG signal is detected at the step 22, the routine proceeds to a step 23 where the controller 3 selects the facsimile mode by switching the switching circuit 6 to connect the facsimile communication circuit 7 to the telephone line 1. On the other hand, when no CNG signal is detected at the step 22, the routine proceeds to a step 24 where the controller 3 selects the automatic answering/recording mode by switching the switching circuit 6 to connect the telephone communication circuit 8 to the telephone line 1. Further, at a step 25, the controller 3 sets an audio recording/reproducing device 10 ready for recording an incoming voice signal from the calling party.

The conventional facsimile apparatus as described above has the following drawbacks:

In the foregoing conventional facsimile apparatus, when the handset is not off-hooked within the predetermined time T2, the facsimile mode is unconditionally selected while the presence operation mode is set.

However, there are occasions where the called party is at home while it takes a time longer than the predetermined time T2 to pick up the handset due to, for example, attending to urgent matters or due to noise which makes it difficult to notice the ringing tone. On these occasions, since the conventional facsimile apparatus is automatically switched to the facsimile mode, the calling party can not perform the telephone conversation with the called party even when the called party is at home. Further, when the called party goes out without setting to the absence operation mode, the calling party can not record his/her message.

SUMMARY OF THE INVENTION

Therefore, it is an object of the present invention to provide an improved facsimile apparatus which is operable in a facsimile mode or a telephone mode.

According to one aspect of the present invention, a facsimile apparatus comprises telephone line closing means for closing a telephone line in response to receipt of a ring signal; ringing tone producing means for producing a ringing tone in response to the receipt of the ring signal; facsimile communication means; facsimile communication start signal detecting means for detecting a facsimile communication start signal sent through the telephone line; automatic telephone answering/recording means for sending an outgoing voice message to the telephone line and for recording an incoming voice signal received through the telephone line; first control means for selecting a facsimile mode to operate the facsimile communication means when the facsimile communication start signal detection means detects the facsimile communication start signal within a first predetermined time after the telephone line closing means closes the telephone line; and second control means for selecting a telephone conversation mode when an operation in response to the ringing tone is performed within a second predetermined time after the receipt of the ring signal and for selecting an automatic telephone answering/recording mode to operate the automatic telephone answering/recording means when no operation is performed in response to the ringing tone within the second predetermined time, the second control means performing the selection between the telephone conversation mode and the automatic telephone answering/recording mode when the facsimile mode is not selected by the first control means.

According to another aspect of the present invention, a facsimile apparatus comprises telephone line closing means for closing a telephone line in response to receipt of a ring signal; ringing tone producing means for producing a ringing tone in response to the receipt of the ring signal; facsimile communication means; facsimile communication start signal detecting means for detecting a facsimile communication start signal sent through the telephone line; automatic telephone answering/recording means for sending an outgoing voice message to the telephone line and for recording an incoming voice signal received through the telephone line; first control means for selecting a facsimile mode to operate the facsimile communication means when the facsimile communication start signal detection means detects the facsimile communication start signal within a first predetermined time after the telephone line closing means closes the telephone line; second control means for selecting a telephone conversation mode when an operation in response to the ringing tone is performed within a second predetermined time after the receipt of the ring signal and for selecting an automatic telephone answering/recording mode to operate the automatic telephone answering/recording means when no operation is performed in response to the ringing tone within the second predetermined time, the second control means performing the selection between the telephone conversation mode and the automatic telephone answering/recording mode when the facsimile mode is not selected by the first control means; and third control means for detecting a voice signal within a third predetermined time during the automatic telephone answering/recording mode being selected by the second control means and for maintaining the automatic telephone answering/recording mode when the voice signal is detected, and for selecting the facsimile mode when no voice signal is detected.

According to still another aspect of the present invention, a facsimile apparatus comprises telephone line closing means for closing a telephone line in response to receipt of a ring signal; ringing tone producing means for producing a ringing tone in response to the receipt of the ring signal; facsimile communication means; facsimile communication start signal detecting means for detecting a facsimile communication start signal sent through the telephone line; automatic telephone answering/recording means for sending an outgoing voice message to the telephone line and for recording an incoming voice signal received through the telephone line; first control means for selecting a facsimile mode to operate the facsimile communication means when the facsimile communication start signal detection means detects the facsimile communication start signal within a first predetermined time after the telephone line closing means closes the telephone line; second control means for selecting a telephone conversation mode when an operation in response to the ringing tone is performed within a second predetermined time after the receipt of the ring signal and for selecting an automatic telephone answering/recording mode to operate the automatic telephone answering/recording means when no operation is performed in response to the ringing tone within the second predetermined time, the second control means performing the selection between the telephone conversation mode and the automatic telephone answering/recording mode when the facsimile mode is not selected by the first control means; and third control means for detecting a voice signal within a third predetermined time when no operation is performed in response to the ringing tone within the second predetermined time and for causing the second control means, when the voice signal is detected, to select the automatic telephone answering/recording mode at a next occurrence of the receipt of the ring signal when no operation is performed in response to the ringing tone within the second predetermined time, and for selecting the facsimile mode when no voice signal is detected.

According to still another aspect of the present invention, a facsimile apparatus comprises telephone line closing means for closing a telephone line in response to receipt of a ring signal; ringing tone producing means for producing a ringing tone in response to the receipt of the ring signal; facsimile communication means; facsimile communication start signal detecting means for detecting a facsimile communication start signal sent through the telephone line; automatic telephone answering/recording means for sending an outgoing voice message to the telephone line and for recording an incoming voice signal received through the telephone line; first control means for selecting a facsimile mode to operate the facsimile communication means when the facsimile communication start signal detection means detects the facsimile communication start signal within a first predetermined time after the telephone line closing means closes the telephone line; second control means for selecting a telephone conversation mode when an operation in response to the ringing tone is performed within a second predetermined time after the receipt of the ring signal and for selecting an automatic telephone answering/recording mode to operate the automatic telephone answering/recording means when no operation is performed in response to the ringing tone within the second predetermined time, the second control means performing the selection between the telephone conversation mode and the automatic telephone answering/recording mode when the facsimile mode is not selected by the first control means; third control means for causing the second control means, when a voice signal is detected within a third predetermined time during the automatic telephone answering/recording mode being selected, to select the automatic telephone answering/recording mode at a next occurrence of the receipt of the ring signal when no operation is performed in response to the ringing tone within the second predetermined time; and fourth control means for selecting the facsimile mode when no voice signal is detected within the third predetermined time during the automatic telephone answering/recording mode being selected.

According to still another aspect of the present invention, a facsimile apparatus comprises telephone line closing means for closing a telephone line in response to receipt of a ring signal; ringing tone producing means for producing a ringing tone in response to the receipt of the ring signal; facsimile communication means; facsimile communication start signal detecting means for detecting a facsimile communication start signal sent through the telephone line; automatic telephone answering/recording means for sending an outgoing voice message to the telephone line and for recording an incoming voice signal received through the telephone line; operation mode setting means for designating at least a presence operation mode or an absence operation mode; first control means for selecting a telephone conversation mode when an operation in response to the ringing tone is performed within a first predetermined time after the receipt of the ring signal and for selecting an automatic telephone answering/recording mode to operate the automatic telephone answering/recording means when no operation is performed in response to the ringing tone within the second predetermined time; second control means for changing the mode designation of the operation mode setting means from the presence operation mode to the absence operation mode when a voice signal is detected within a second predetermined time during the automatic telephone answering/recording mode being selected; and third control means for selecting a facsimile mode to operate the facsimile communication means when the facsimile communication start signal detecting means detects the facsimile communication start signal within a third predetermined time after the telephone line closing means closes the telephone line and for selecting the automatic telephone answering/recording mode when the facsimile communication start signal detecting means detects no facsimile communication start signal within the third predetermined time, the third control means performing the selection between the facsimile mode and the automatic telephone answering/recording mode when the mode designation of the operation mode setting means is set to the absence operation mode.

According to still another aspect of the present invention, a facsimile apparatus comprises telephone line closing means for closing a telephone line in response to receipt of a ring signal from a calling party; ringing tone producing means for producing a ringing tone in response to the receipt of the ring signal; and control means for performing selection among at least a facsimile mode which allows a facsimile communication through the telephone line, a telephone conversation mode which allows a telephone conversation through the telephone line and an automatic telephone answering/recording mode which allows an outgoing voice message to be reproduced for sending through the telephone line and further allows an incoming voice message sent through the telephone line to be recorded, the control means comprising first means for determining whether a facsimile communication start signal is received within a first predetermined time after the telephone line closing means closes the telephone line; second means for selecting the facsimile mode when the first means determines that the facsimile communication start signal is received within the first predetermined time; third means for determining, when the first means determines that no facsimile communication start signal is received within the first predetermined time, whether a called party performs an operation in response to the ringing tone within a second predetermined time; fourth means for selecting the telephone conversation mode when the third means determines that the called party performs the operation within the second predetermined time and for selecting the automatic telephone answering/recording mode when the third means determines that the called party performs no operation within the second predetermined time; fifth means for determining, when the third means determines that the called party performs no operation within the second predetermined time, whether a voice signal from the calling party is received within a third predetermined time; and sixth means for selecting the facsimile mode when the fifth means determines that no voice signal is received within the third predetermined time.

According to still another aspect of the present invention, a facsimile apparatus comprises telephone line closing means for closing a telephone line in response to receipt of a ring signal from a calling party; ringing tone producing means for producing a ringing tone in response to the receipt of the ring signal; operation mode setting means for designating at least a presence operation mode where a called party is assumed available or an absence operation mode where the called party is assumed non-available; and control means for performing selection, during the presence operation mode being designated, among at least a facsimile mode which allows a facsimile communication through the telephone line, a telephone conversation mode which allows a telephone conversation through the telephone line and an automatic telephone answering/recording mode which allows an outgoing voice message to be reproduced for sending through the telephone line and further allows an incoming voice message sent through the telephone line to be recorded, the control means comprising first means for determining whether a facsimile communication start signal is received within a first predetermined time after the telephone line closing means closes the telephone line; second means for selecting the facsimile mode when the first means determines that the facsimile communication start signal is received within the first predetermined time; third means for determining, when the first means determines that no facsimile communication start signal is received within the first predetermined time, whether a called party performs an operation in response to the ringing tone within a second predetermined time; fourth means for selecting the telephone conversation mode when the third means determines that the called party performs the operation within the second predetermined time and for selecting the automatic telephone answering/recording mode when the third means determines that the called party performs no operation within the second predetermined time; fifth means for determining, when the third means determines that the called party performs no operation within the second predetermined time, whether a voice signal from the calling party is received within a third predetermined time; sixth means for selecting the facsimile mode when the fifth means determines that no voice signal is received within the third predetermined time; and seventh means for changing the mode designation of the operation mode setting means from the presence operation mode to the absence operation mode for a next occurrence of the receipt of the ring signal when the fifth means determines that the voice signal is received within the third predetermined time.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings.

DESCRIPTION OF THE PREFERRED EMBODIMENT

Now, preferred embodiments of the present invention will be described hereinbelow with reference to the accompanying drawings.

Figure 1:
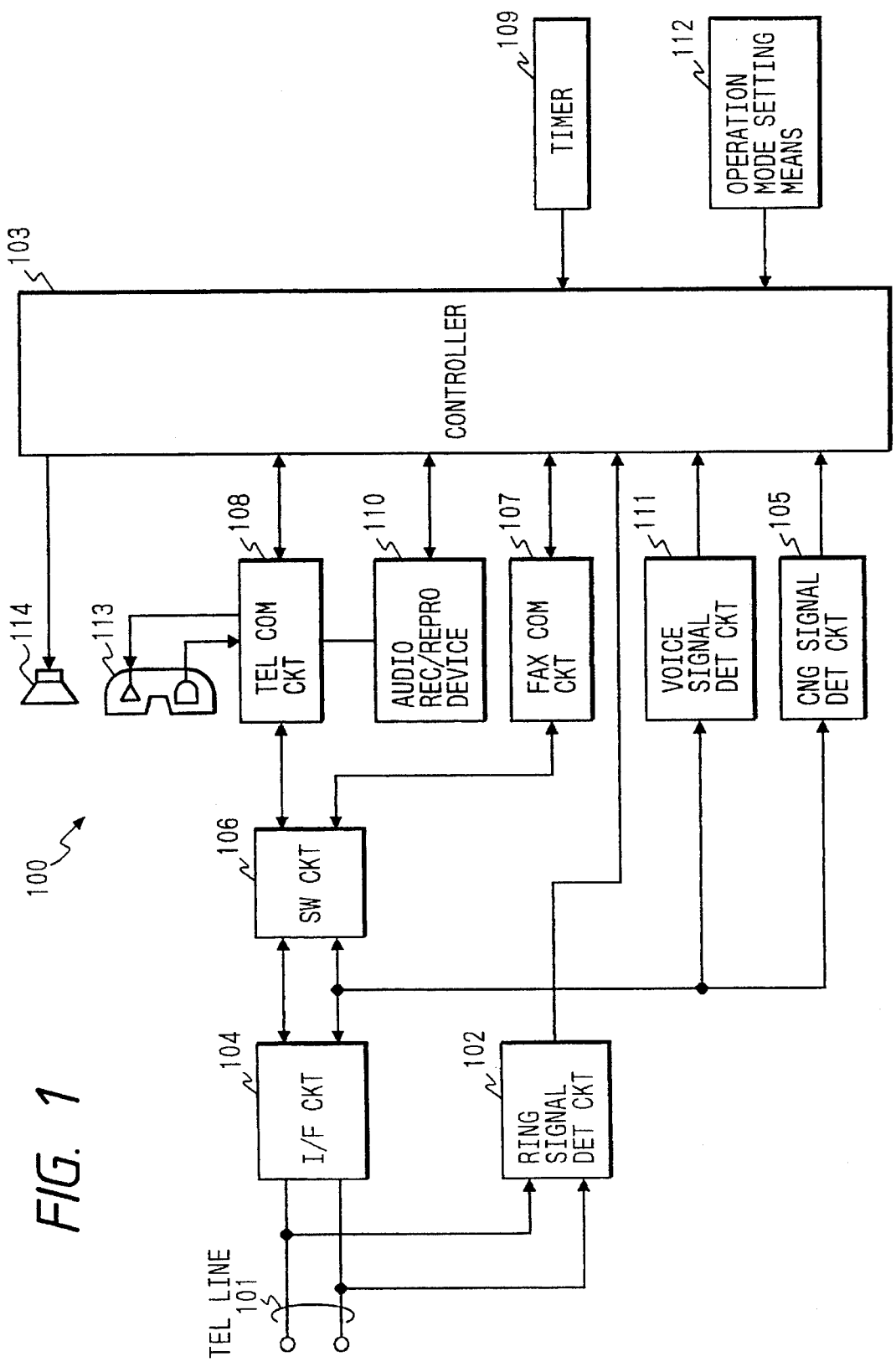
FIG. 1 is a block diagram showing a schematic structure of a facsimile apparatus according to a first preferred embodiment of the present invention.

FIG. 1 is a block diagram showing a schematic structure of a facsimile apparatus 100 according to a first preferred embodiment of the present invention. The facsimile apparatus 100 in FIG. 1 is operable in a facsimile mode or a telephone mode. In the facsimile mode, a facsimile communication can be performed through a telephone line 101. The telephone mode includes a conversation mode where a conversation between a calling party and a called party can be performed through the telephone line 101, and an automatic answering/recording mode where a recorded outgoing message is reproduced and sent to the calling party through the telephone line 101 and an incoming message from the calling party through the telephone line 101 can be automatically recorded. The facsimile apparatus 100 can be set to a presence operation mode where the called party is available to answer the call, or an absence operation mode where the called party is not available to answer the call. In the presence operation mode, the facsimile apparatus is operable in the facsimile mode, the conversation mode or the automatic answering/recording mode. On the other hand, in the absence operation mode, the facsimile apparatus is operable in the facsimile mode or the automatic answering/recording mode.

Specifically, in FIG. 1, the facsimile apparatus 100 comprises a ring signal detection circuit 102 connected to the telephone line 101 for detecting a ring signal sent through the telephone line 101, a controller 103 including, such as, a microcomputer, an interface circuit 104 connected to the telephone line 101 for closing the telephone line 101 so as to connect between the calling party and the called party in response to a control signal from the controller 103 when the ring signal is detected by the ring signal detection circuit 102, a facsimile communication start signal detection circuit (hereinafter referred to as "CNG signal detection circuit") 105 for detecting a facsimile communication start signal (hereinafter referred to as "CNG signal") sent through the telephone line 101 when the caller is a facsimile apparatus being operated under an automatic calling mode, a switching circuit 106 for switching between the facsimile mode and the telephone mode, a facsimile communication circuit 107 which is connected to the telephone line 101 through the switching circuit 106 in the facsimile mode for enabling the facsimile communication between the facsimile apparatus 100 and a facsimile apparatus at an opposite side, and a telephone communication circuit 108 which is connected to the telephone line 101 through the switching circuit 106 in the telephone mode, that is, in the conversation mode or the automatic answering/recording mode. The facsimile apparatus 100 further comprises a timer 109, and an audio recording/reproducing device 110 connected to the telephone communication circuit 108. The audio recording/reproducing device 110 includes, such as, audio tape recorders or an audio recording integrated circuit (IC) for recording the incoming message from the calling party received via the telephone line 101 and the telephone communication circuit 108 and the outgoing message to be sent to the calling party via the telephone communication circuit 108 and the telephone line 101 and for reproducing or playing back the recorded incoming message for the called party and the recorded outgoing message for the calling party. The audio recording/reproducing device 110 may be arranged to record the conversation between the calling and called parties according to a manual operation of a selection key (not shown). The facsimile apparatus 100 further comprises a speech or voice signal detection circuit 111 for detecting a voice signal sent through the telephone line 101, a manually operable operation mode setting means 112 in the form of, for example, a selection key for manually setting one of the presence and absence operation modes, a telephone handset 113 connected to the telephone communication circuit 108 for performing the conversation between the calling and called parties, and a speaker 114 for producing, such as, a calling or ringing tone for the called party in response to a control signal from the controller 103.

Figure 2:
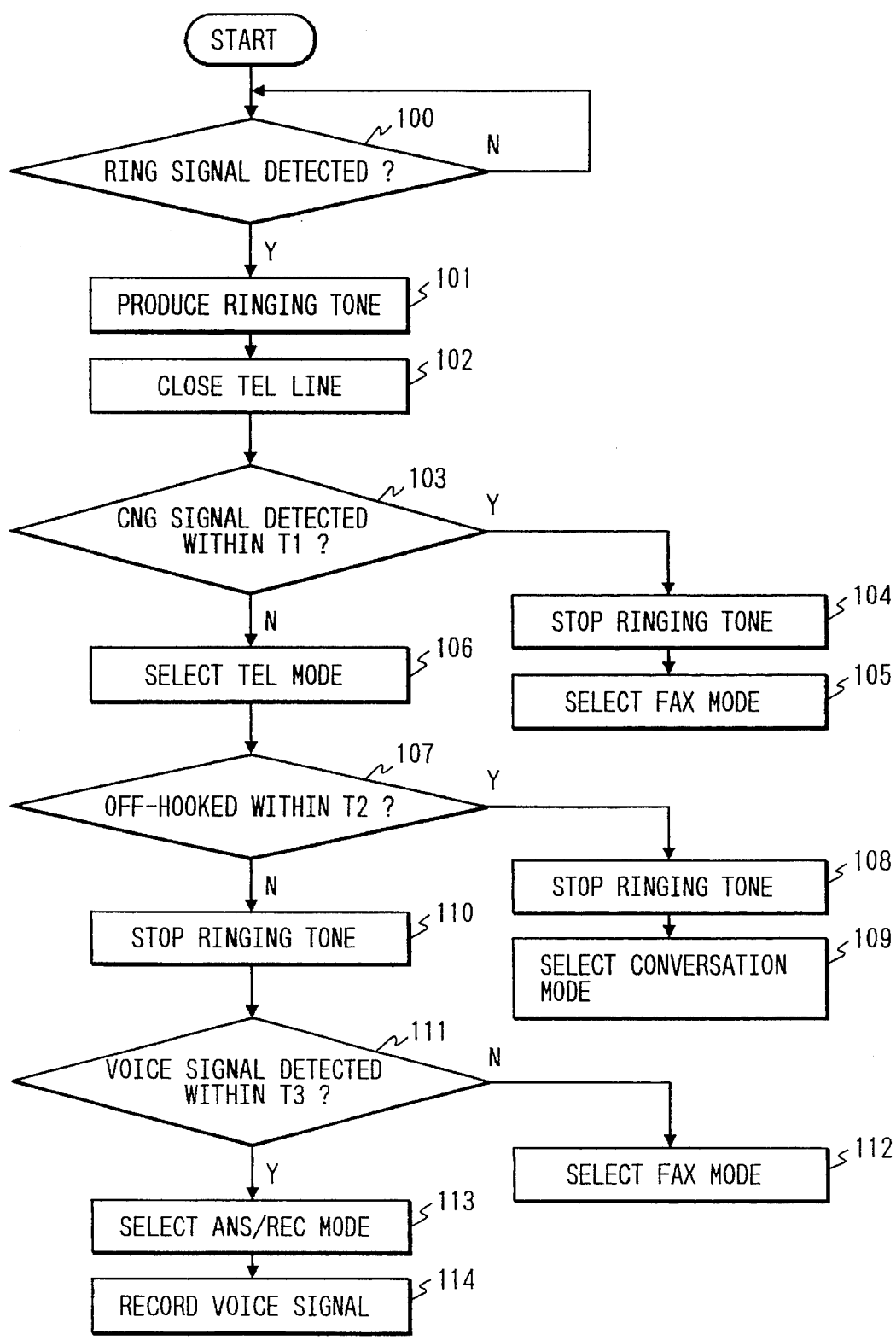
FIG. 2 is a flowchart of a control routine to be executed by a controller for performing selection among a facsimile mode, a conversation mode and an automatic answering/recording mode when a presence operation mode is being set, according to the first preferred embodiment.

FIG. 2 is a flowchart of a control routine to be executed by the controller 103 for performing selection among the facsimile mode, the conversation mode and the automatic answering/recording mode when the presence operation mode is being set by the operation mode setting means 112.

In FIG. 2, at a first step 100, it is determined whether the ring signal from the caller is received through the telephone line 101, based on a detection signal from the ring signal detection circuit 102. When no ring signal is detected, the step 100 is repeated. On the other hand, when the ring signal is detected, the routine proceeds to a step 101 where the controller 103 controls the speaker 114 to produce the ringing tone. The ringing tone intermittently continues until the controller 103 stops it at a later step 104, 108 or 110. Subsequently, at a step 102, the controller 103 controls the interface circuit 104 so as to close the telephone line 101. It may be arranged that the telephone line 101 is closed after a lapse of a given time (for example, about 5 seconds) from a time point when the speaker 114 starts to produce the ringing tone.

A subsequent step 103 determines based on a detection signal from the CNG signal detection circuit 105 whether the CNG signal is detected within a predetermined time T1 (for example, about 4 seconds) from a time point when the telephone line 101 is closed at the step 102. The predetermined time T1 is preset in the timer 109. When the CNG signal is detected at the step 103, that is, the caller is the facsimile apparatus being operated under the automatic calling mode, the routine proceeds to the step 104 which stops the speaker 114 from producing the ringing tone, and then to a step 105 where the facsimile mode is selected. Specifically, the controller 103 controls the switching circuit 106 to connect the facsimile communication circuit 107 to the telephone line 101 so that the facsimile communication can be performed with the caller facsimile apparatus. On the other hand, when no CNG signal is detected at the step 103, the routine proceeds to a step 106 where the telephone mode is selected. Specifically, the controller 103 controls the switching circuit 106 to connect the telephone communication circuit 108 to the telephone line 101.

The routine now proceeds to a step 107 which determines whether the telephone handset 113 is off-hooked or removed from its cradle within a predetermined time T2 from a time point when the ring signal is detected at the step 100. The controller 103 makes this decision by monitoring a condition of a hook switch (not shown) which turns on when the handset 113 is off-hooked. The predetermined time T2 is preset in the timer 109. It may be arranged that the predetermined time T2 is counted from a time point equivalent to the above-noted time point, for example, when the speaker 114 starts to produce the ringing tone at the step 101 or when the telephone line 101 is closed at the step 102. The predetermined time T2 is determined so as to allow the speaker 114 to produce the ringing tone, for example, three to six times. When the handset 113 is off-hooked at the step 107, the routine proceeds to the step 108 where the controller 103 stops the speaker 114 from producing the ringing tone, and then to a step 109 where the conversation mode is selected so that the conversation can be performed between the calling and called parties. Practically, when the handset 113 is off-hooked at the step 107, the conversation mode is immediately effected.

On the other hand, when the step 107 determines that the handset 113 is not off-hooked within the predetermined time T2, the routine proceeds to the step 110 where the controller 103 stops the speaker 114 from producing the ringing tone, and then to a step 111 which determines whether the voice signal is detected within a predetermined time T3 (for example, about 4 seconds) from a time point when the ringing tone is stopped at the step 110. The controller 103 makes this decision at the step 111 based on a detection signal from the voice signal detection circuit 111. The predetermined time T3 is preset in the timer 109. When the voice signal is not detected at the step 111, the routine proceeds to a step 112 where the facsimile mode is selected, that is, the switching circuit 106 connects the facsimile communication circuit 107 to the telephone line 101 so that the facsimile communication can be performed with the caller facsimile apparatus. On the other hand, when the voice signal is detected at the step 111, the routine proceeds to a step 113, where the automatic answering/recording mode is selected. Specifically, the controller 103 controls the audio recording/reproducing device 110 to first play back the recorded outgoing message and sends this message to the calling party via the telephone communication circuit 108, the switching circuit 106 and the interface circuit 104. The outgoing message is, for example, "The called party is out. An incoming message will be recorded following a tone sound at the end of the announcement". The controller 103 further controls the audio recording/reproducing device 110 to now record the incoming message from the calling party at a step 114. The audio recording/reproducing device 110 is set ready for recording the incoming message at termination of the tone sound at the end of the announcement.

The predetermined time T3 is preset to about 4 seconds in consideration that 4 seconds after the ringing tone is stopped are normally enough for the calling party to utter a beginning part of his/her message, for example, "Ah, this is . . . " so that the voice signal can be detected if the calling party wishes the telephone communication. As appreciated, when the ringing tone is stopped, a ring back tone for the calling party is also stopped.

In a modification of the first preferred embodiment, it may be arranged that the controller 103 presumably or temporarily selects the automatic answering/recording mode after the step 110. Specifically, after the step 110, the controller 103 controls the audio recording/reproducing device 110 to play back the recorded outgoing message and sends this message to the calling party. The outgoing message this time is, for example, "The called party is out. Please send a facsimile message when requesting a facsimile communication. When requesting a telephone communication, an incoming message will be recorded following a tone sound at the end of the announcement". Subsequently, the controller 103 determines whether the voice signal is detected within a predetermined time T3 (for example, about 4 seconds) from a time point of termination of the above-noted tone sound at the end of the outgoing message. When the voice signal is not detected within the predetermined time T3, the controller 103 selects the facsimile mode by controlling the switching circuit 106 to connect the facsimile communication circuit 107 to the telephone line 101. On the other hand, when the voice signal is detected within the predetermined time T3, the selection of the automatic answering/recording mode is finally determined so that the controller 103 controls the audio recording/reproducing device 110 to now record the incoming message from the calling party.

It is to be appreciated that, in the foregoing first preferred embodiment and the foregoing modification thereof, when the handset 113 is off-hooked after the step 107 determines that the handset 113 is not off-hooked within the predetermined time T2, the conversation mode is immediately effected as long as the telephone communication circuit 108 is connected to the telephone line 101 via the switching circuit 106. When, for example, the handset 113 is off-hooked during the outgoing message being reproduced and sent to the calling party, the conversation mode is immediately effected while the controller 103 inhibits the audio recording/reproducing device 110 from reproducing the outgoing message. Further, when the handset 113 is off-hooked during the audio recording/reproducing device 110 being activated to record the incoming message, the conversation mode is immediately effected while the controller 103 inhibits the audio recording/reproducing device 110 from recording the incoming message. In this case, the conversation between the calling and called parties can be recorded by manually operating the selection key (not shown) as described before.

It is to be further appreciated that, in the foregoing first preferred embodiment and the foregoing modification thereof, the facsimile apparatus 100 has a stand-by state where the switching circuit 106 is switched to the telephone communication circuit 108. Accordingly, even when the communication is finished in the facsimile mode, the switching circuit 106 is automatically switched to the telephone communication circuit 108 by the controller 103 so as to bring the facsimile apparatus 100 into the stand-by state.

Figure 3:
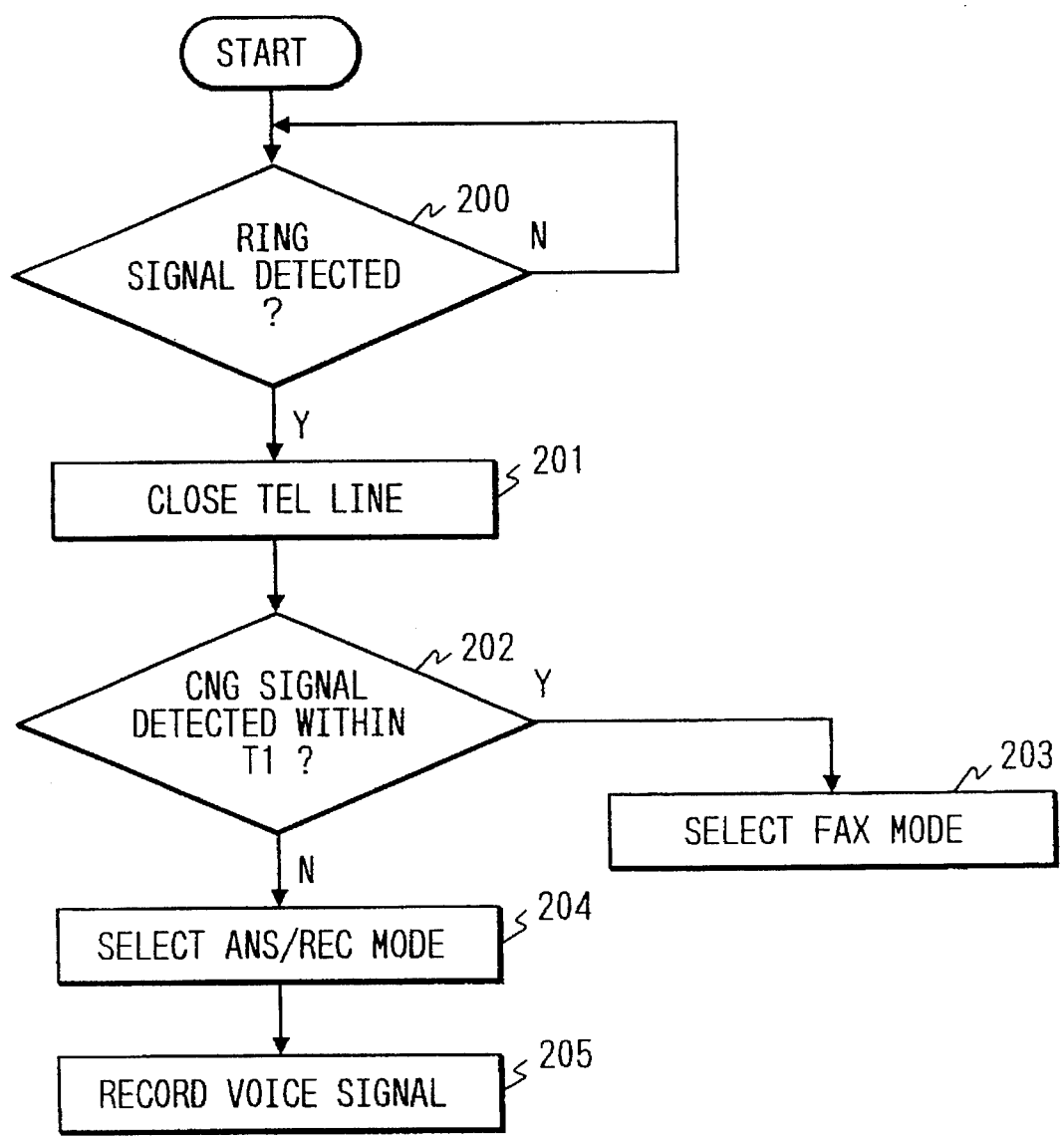
FIG. 3 is a flowchart of a control routine to be executed by the controller for performing selection between a facsimile mode and an automatic answering/recording mode when an absence operation mode is being set, according to the first preferred embodiment.

FIG. 3 is a flowchart of a control routine to be executed by the controller 103 for performing selection between the facsimile mode and the automatic answering/recording mode when the absence operation mode is being set by the operation mode setting means 112, according to the first preferred embodiment.

In FIG. 3, at a first step 200, it is determined whether the ring signal from the caller is received through the telephone line 101, based on the detection signal from the ring signal detection circuit 102. When no ring signal is detected, the step 200 is repeated. On the other hand, when the ring signal is detected, the routine proceeds to a step 201 where the controller 103 controls the interface circuit 104 so as to close the telephone line 101.

A subsequent step 202 determines based on the detection signal from the CNG signal detection circuit 105 whether the CNG signal is detected within the predetermined time T1. When the CNG signal is detected at the step 202, the routine proceeds to a step 203 where the facsimile mode is selected. Specifically, the controller 103 controls the switching circuit 106 to connect the facsimile communication circuit 107 to the telephone line 101 so that the facsimile communication can be performed with the caller facsimile apparatus. On the other hand, when no CNG signal is detected at the step 202, the routine proceeds to a step 204 where the automatic answering/recording mode is selected. Specifically, the controller 103 controls the switching circuit 106 to connect the telephone communication circuit 108 to the telephone line 101 and further controls the audio recording/reproducing device 110 to first play back the recorded outgoing message for sending to the calling party. In the automatic answering/recording mode, the controller 103 thereafter controls the audio recording/reproducing device 110 to record the voice signal from the calling party. The outgoing message is, for example, "The called party is out. An incoming message will be recorded following a tone sound at the end of the announcement". The audio recording/reproducing device 110 is set ready for recording the incoming message at termination of the tone sound at the end of the announcement.

Figure 9:
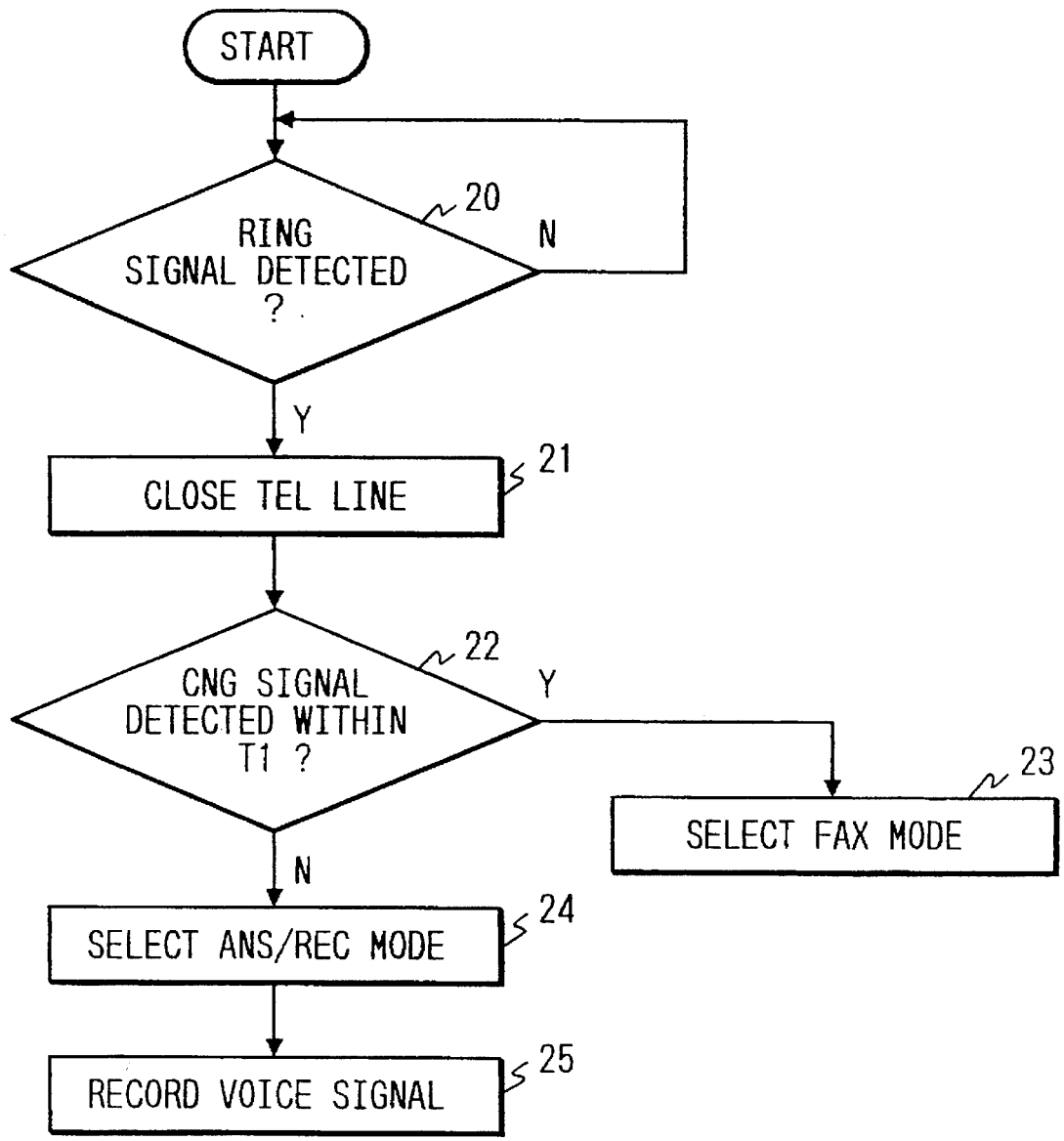
FIG. 9 is a flowchart of a control routine to be executed in an absence operation mode for performing selection between a facsimile mode and an automatic answering/recording mode, according to the prior art.

As appreciated, the steps 200 to 205 in FIG. 3 just correspond to the steps 20 to 25 in FIG. 9 of the prior art, respectively.

Now, a second preferred embodiment of the facsimile apparatus according to the present invention will be described with reference to FIG. 4.

Figure 4:
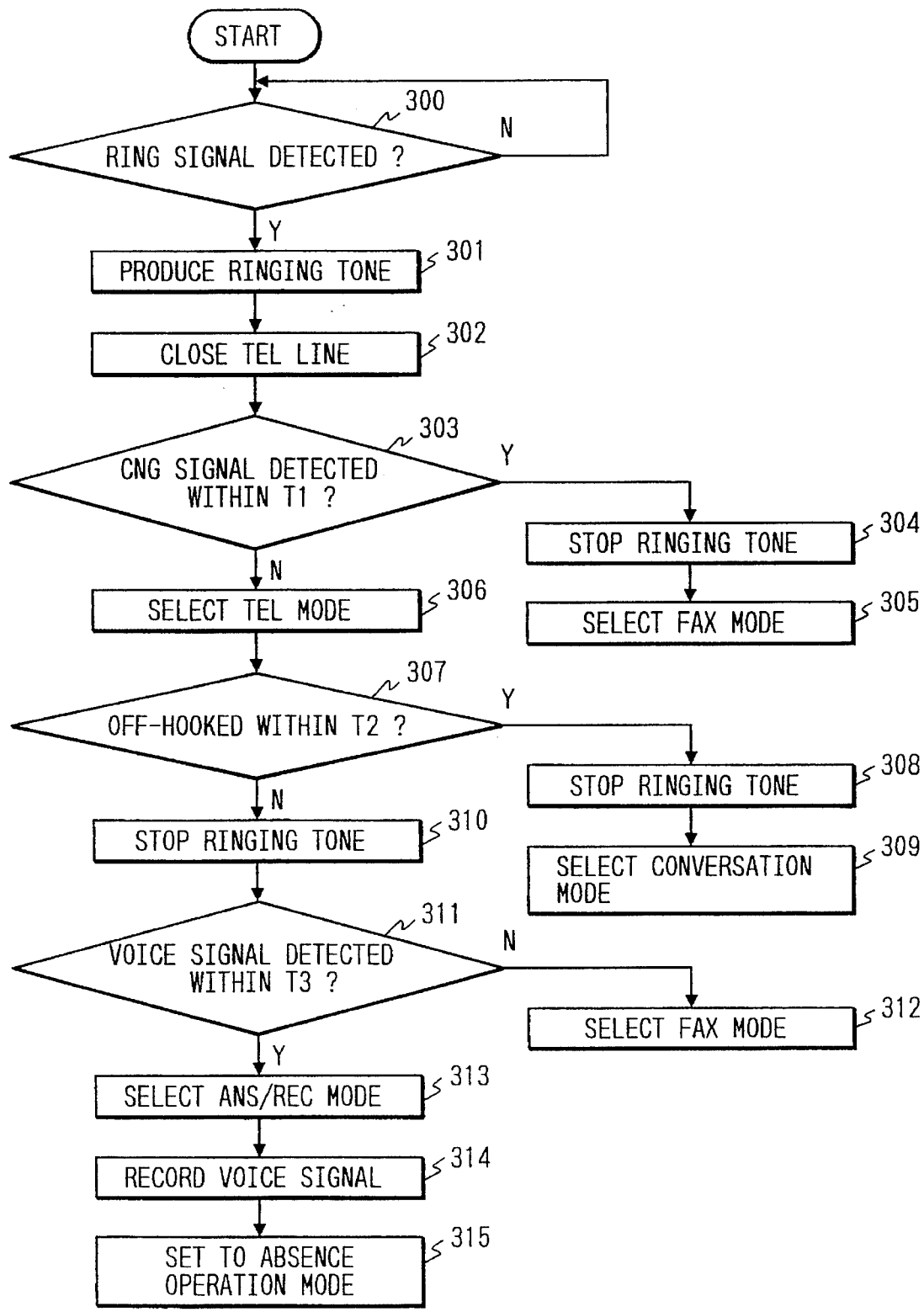
FIG. 4 is a flowchart of a control routine to be executed by the controller for performing selection among the facsimile mode, the conversation mode and the automatic answering/recording mode when the presence operation mode is being set, according to a second preferred embodiment of the present invention.

FIG. 4 is a flowchart of a control routine to be executed by the controller 103 for performing selection among the facsimile mode, the conversation mode and the automatic answering/recording mode when the presence operation mode is being set by the operation mode setting means 112.

In FIG. 4, steps 300 to 314 just correspond to the steps 100 to 114 in FIG. 2, respectively. Accordingly, the flowchart of FIG. 4 differs from that of FIG. 2 only in that a step 315 is provided subsequent to the step 314. The other structure of the second preferred embodiment is the same as that of the first preferred embodiment.

As appreciated from the flowchart of FIG. 4, in the second preferred embodiment, the step 315 is executed subsequent to the step 314 so as to automatically switch the presence operation mode manually designated by the operation mode setting means 112 to the absence operation mode. In other words, the controller 103 automatically changes the designation of the operation mode setting means 112 from the presence operation mode to the absence operation mode after the automatic answering/recording mode is executed at the steps 313 and 314.

Accordingly, even if the called party fails to set the operation mode to the absence operation mode when, for example, going out, the absence operation mode is automatically set once the automatic answering/recording mode is executed. As a result, the control routine of FIG. 3 is executed upon the next occurrence of the ring signal from the calling party so that the mode selection is quickly performed between the facsimile mode and the automatic answering/recording mode.

The foregoing modification of the first preferred embodiment may also be applied to the second preferred embodiment.

Now, a third preferred embodiment of the facsimile apparatus according to the present invention will be described with reference to FIG. 5.

Figure 5:
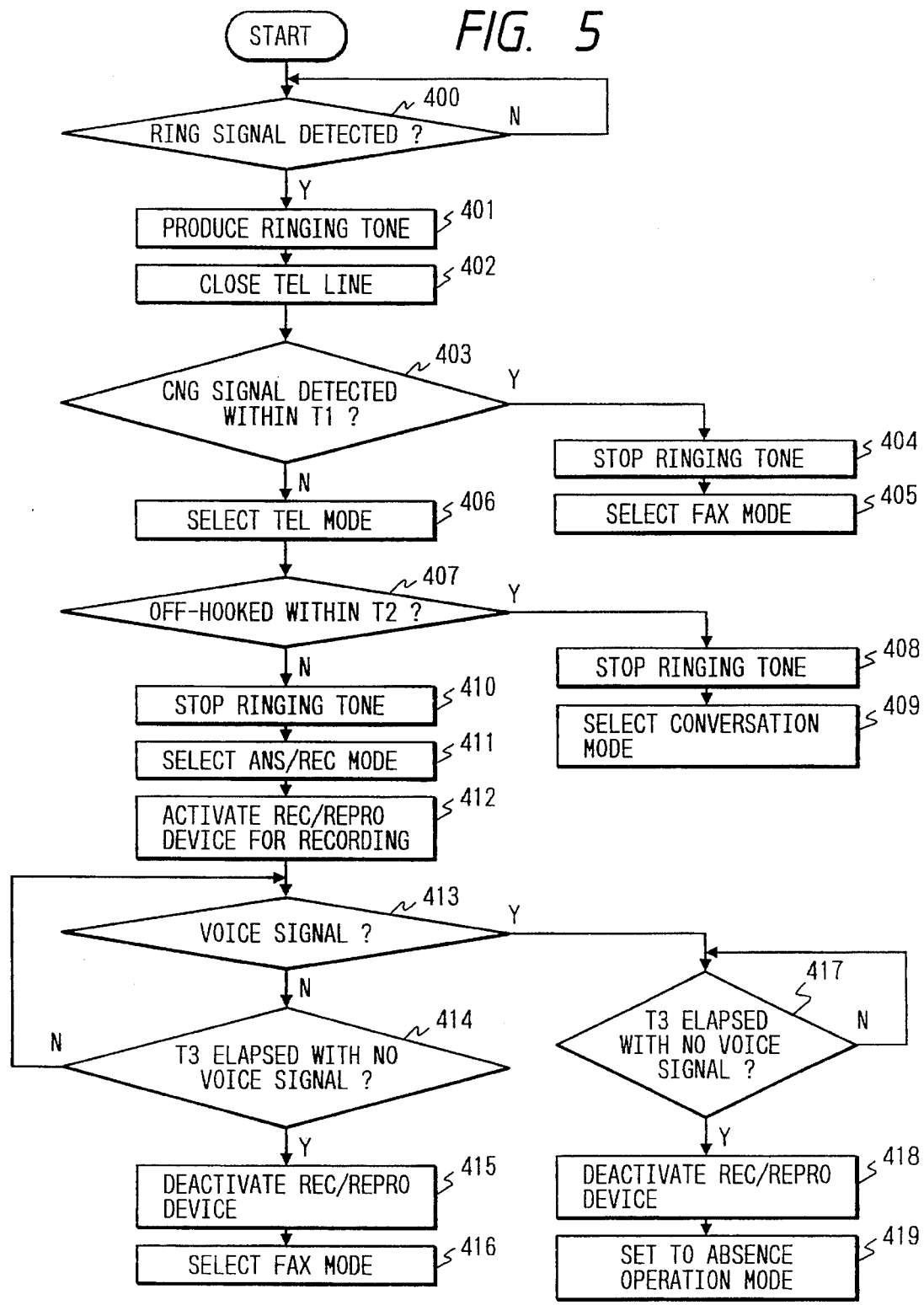
FIG. 5 is a flowchart of a control routine to be executed by the controller for performing selection among the facsimile mode, the conversation mode and the automatic answering/recording mode when the presence operation mode is being set, according to a third preferred embodiment of the present invention.

FIG. 5 is a flowchart of a control routine to be executed by the controller 103 for performing selection among the facsimile mode, the conversation mode and the automatic answering/recording mode when the presence operation mode is being set by the operation mode setting means 112.

In FIG. 5, steps 400 to 410 just correspond to the steps 100 to 110 in FIG. 2, respectively. Accordingly, explanation thereof will be omitted hereinbelow for avoiding the redundant disclosure.

In FIG. 5, after the step 410 is executed, the routine proceeds to a step 411 where the automatic answering/recording mode is selected. Specifically, the controller 103 activates the audio recording/reproducing device 110 to play back the recorded outgoing message for sending to the calling party. The outgoing message this time is, for example, "The called party is out. Please send a facsimile message when requesting a facsimile communication. When requesting a telephone communication, an incoming message will be recorded following a tone sound at the end of the announcement". In the execution of the automatic answering/recording mode, the controller 103 further activates the audio recording/reproducing device 110 for recording the voice signal from the calling party at a step 412. The audio recording/reproducing device 110 is set ready for recording the voice signal from the calling party at termination of the above-noted tone sound at the end of the announcement.

The routine then proceeds to a step 413 which determines whether the voice signal is detected, based on the detection signal from the voice signal detection circuit 111. When the voice signal is not detected at the step 413, the routine proceeds to a step 414 which determines whether the predetermined time T3 (for example, about 4 seconds) has elapsed with no voice signal detected from a time point when the audio recording/reproducing device 110 is set ready for recording at the step 412 or from a time point of termination of the above-noted tone sound. The execution of the steps 413 and 414 is repeated until the predetermined time T3 has elapsed at the step 414 or until the voice signal is detected at the step 413.

When the predetermined time T3 has elapsed at the step 414, the routine proceeds to a step 415 where the controller 103 deactivates the audio recording/reproducing device 110, and further to a step 416 where the facsimile mode is selected by switching the switching circuit 106 to the facsimile communication circuit 107 for connection to the telephone line 101.

On the other hand, when the voice signal is detected at the step 413, the routine proceeds to a step 417 which determines whether the predetermined time T3 has elapsed with no voice signal detected from a time point when the voice signal is stopped or disappeared. The execution of the step 417 is repeated until the predetermined time T3 has elapsed.

On the other hand, when the predetermined time T3 has elapsed at the step 417, the routine proceeds to a step 418 where the controller 103 deactivates the audio recording/reproducing device 110, and further to a step 419 where the controller 103 changes the designation of the operation mode setting means 112 from the presence operation mode to the absence operation mode. Accordingly, the absence operation mode is executed according to the control routine of FIG. 3 upon the next occurrence of the ring signal from the calling party.

As appreciated from the foregoing description, in the third preferred embodiment, the audio recording/reproducing device 110 is set ready for recording the voice signal before determining whether the voice signal is detected or not. Accordingly, the incoming message from the calling party can be entirely recorded from the beginning.

Figure 6:
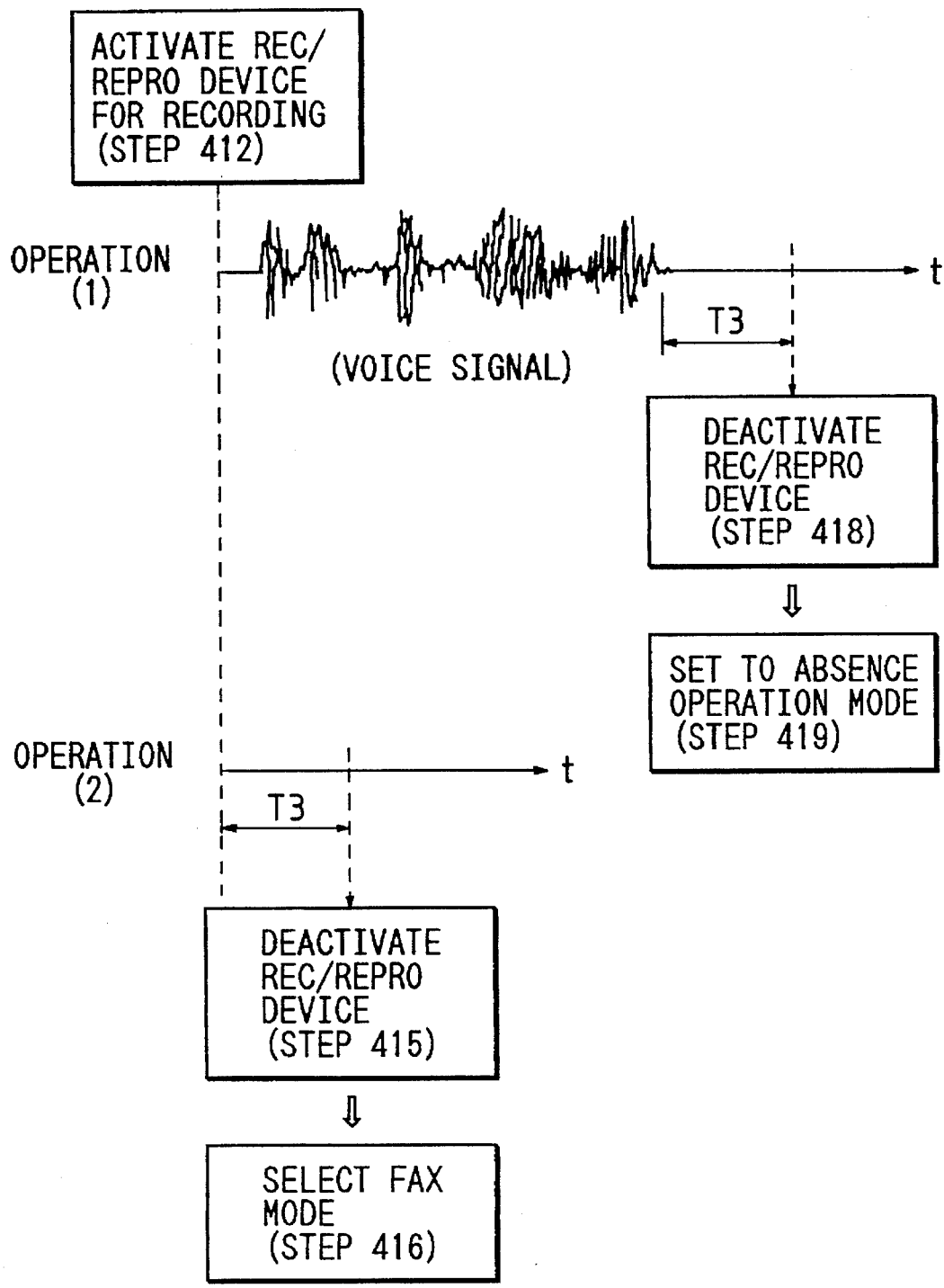
FIG. 6 is a time-domain diagram for explaining the operation of the control routine of FIG. 5.
Figure 7:
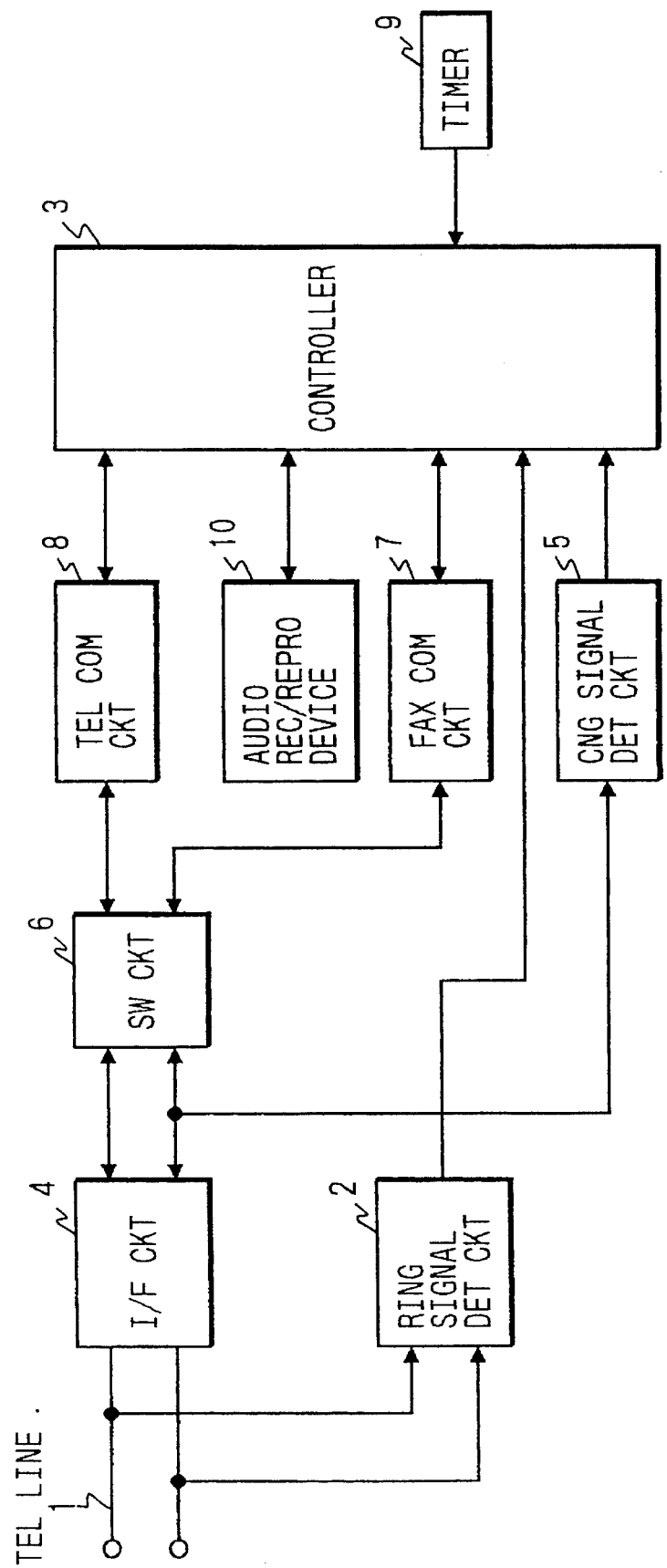
FIG. 7 is a block diagram showing a schematic structure of a conventional facsimile apparatus.
Figure 8:
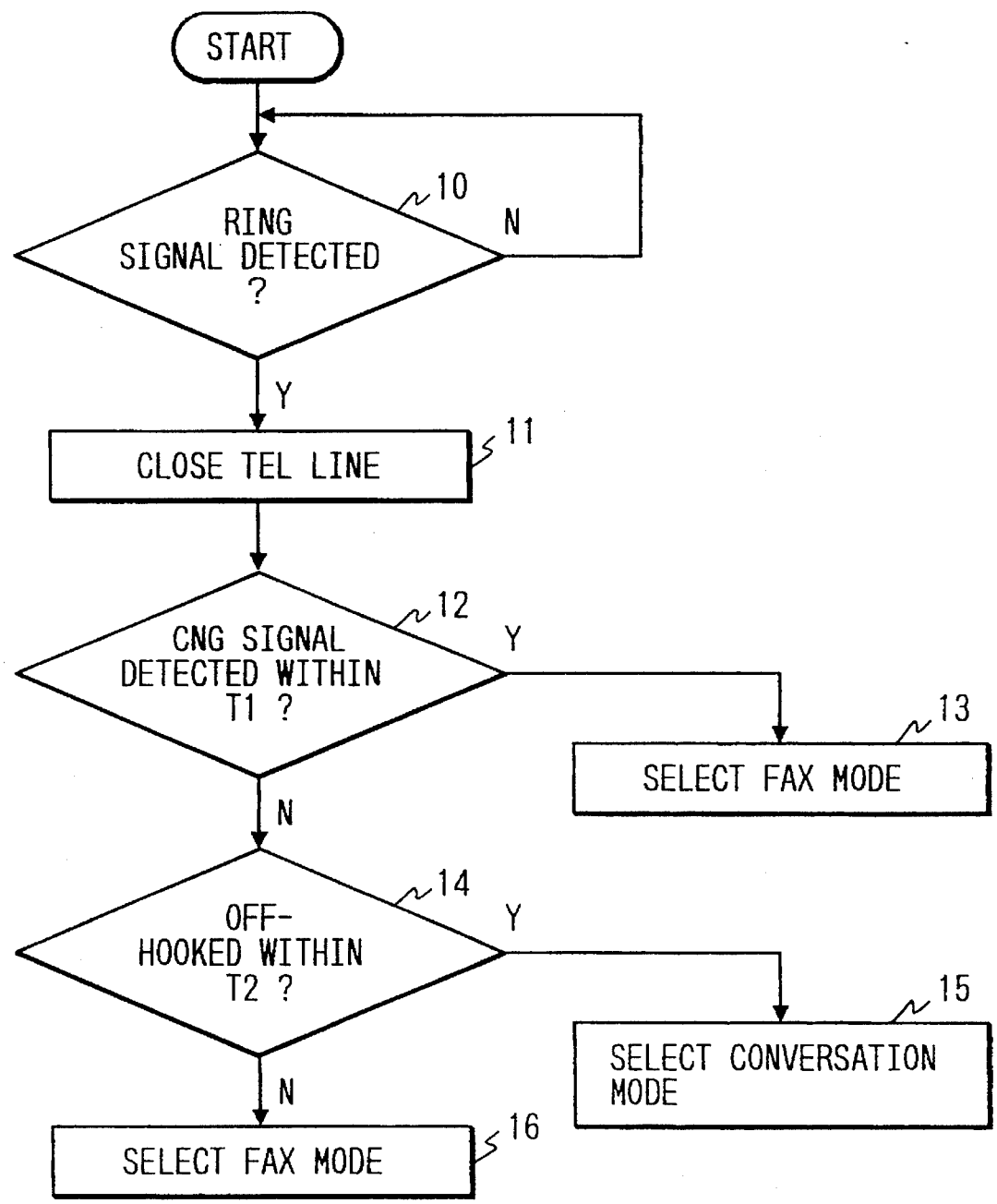
FIG. 8 is a flowchart of a control routine to be executed in a presence operation mode for performing selection between a facsimile mode and a conversation mode, according to the prior art.

FIG. 6 is a time-domain diagram showing the operation of the steps 412 to 419. As seen from OPERATION (2) in FIG. 6, when the predetermined time T3 has elapsed at the step 414 with no voice signal detected at the step 413, the audio recording/reproducing device 110 is deactivated at the step 415 and the facsimile mode is selected at the step 416. On the other hand, as seen from OPERATION (1) in FIG. 6, once the voice signal is detected at the step 413, the automatic answering/recording mode is maintained until the predetermined time T3 has elapsed at the step 417 after the voice signal is stopped, that is, until it is assumed that the recording of the incoming message from the calling party has been finished. When the predetermined time T3 has elapsed at the step 417, the audio recording/reproducing device 110 is deactivated at the step 418 and the absence operation mode is set for the next occurrence of the ring signal from the calling party at the step 419.

The other structure of the third preferred embodiment is the same as that of the first preferred embodiment.

It is to be understood that this invention is not to be limited to the preferred embodiments and modifications described above, and that various changes and modifications may be made without departing from the spirit and scope of the invention as defined in the appended claims.

What is claimed is:

1. A facsimile apparatus comprising:

telephone line closing means for closing a telephone line in response to receipt of a ring signal;

ringing tone producing means for producing a ringing tone in response to the receipt of the ring signal;

facsimile communication means;

facsimile communication start signal detecting means for detecting a facsimile communication start signal sent through the telephone line;

automatic telephone answering/recording means for sending an outgoing voice message to the telephone line and for recording an incoming voice signal received through the telephone line;

first control means for selecting a facsimile mode to operate said facsimile communication means when said facsimile communication start signal detecting means detects said facsimile communication start signal within a first predetermined time after said telephone line closing means closes the telephone line; and second control means for selecting a telephone conversation mode when an operation in response to said ringing tone is performed within a second predetermined time after the receipt of said ring signal and for selecting an automatic telephone answering/recording mode to operate said automatic telephone answering/recording means when the operation is not performed in response to said ringing tone within said second predetermined time, said second control means performing said selection between said telephone conversation mode and said automatic telephone answering/recording mode when said facsimile mode is not selected by said first control means.

2. The facsimile apparatus as set forth in claim 1, wherein said ringing tone producing means continues to produce the ringing tone even after the telephone line closing means closes the telephone line.

3. The facsimile apparatus as set forth in claim 2, wherein ringing tone stopping means is provided for stopping said ringing tone when one of the facsimile mode, the telephone conversation mode and the automatic telephone answering/recording mode is selected.

4. A facsimile apparatus comprising:

telephone line closing means for closing a telephone line in response to receipt of a ring signal;

ringing tone producing means for producing a ringing tone in response to the receipt of the ring signal;

facsimile communication means;

facsimile communication start signal detecting means for detecting a facsimile communication start signal sent through the telephone line;

automatic telephone answering/recording means for sending an outgoing voice message to the telephone line and for recording an incoming voice signal received through the telephone line;

first control means for selecting a facsimile mode to operate said facsimile communication means when said facsimile communication start signal detecting means detects said facsimile communication start signal within a first predetermined time after said telephone line closing means closes the telephone line;

second control means for selecting a telephone conversation mode when an operation in response to said ringing tone is performed within a second predetermined time after the receipt of said ring signal and for selecting an automatic telephone answering/recording mode to operate said automatic telephone answering/recording means when the operation is not performed in response to said ringing tone within said second predetermined time, said second control means performing said selection between said telephone conversation mode and said automatic telephone answering/recording mode when said facsimile mode is not selected by said first control means; and third control means for detecting a voice signal within a third predetermined time during said automatic telephone answering/recording mode being selected by said second control means and for maintaining said automatic telephone answering/recording mode when the voice signal is detected, and for selecting said facsimile mode when the voice signal is not detected.

5. The facsimile apparatus as set forth in claim 4, wherein said ringing tone producing means continues to produce the ringing tone even after the telephone line closing means closes the telephone line.

6. The facsimile apparatus as set forth in claim 5, wherein ringing tone stopping means is provided for stopping said ringing tone when one of the facsimile mode, the telephone conversation mode and the automatic telephone answering/recording mode is selected by said first control means or said second control means.

7. A facsimile apparatus comprising:

telephone line closing means for closing a telephone line in response to receipt of a ring signal;

ringing tone producing means for producing a ringing tone in response to the receipt of the ring signal;

facsimile communication means;

facsimile communication start signal detecting means for detecting a facsimile communication start signal sent through the telephone line;

automatic telephone answering/recording means for sending an outgoing voice message to the telephone line and for recording an incoming voice signal received through the telephone line;

first control means for selecting a facsimile mode to operate said facsimile communication means when said facsimile communication start signal detecting means detects said facsimile communication start signal within a first predetermined time after said telephone line closing means closes the telephone line;

second control means for selecting a telephone conversation mode when an operation in response to said ringing tone is performed within a second predetermined time after the receipt of said ring signal and for selecting an automatic telephone answering/recording mode to operate said automatic telephone answering/recording means when the operation is not performed in response to said ringing tone within said second predetermined time, said second control means performing said selection between said telephone conversation mode and said automatic telephone answering/recording mode when said facsimile mode is not selected by said first control means; and third control means for detecting a voice signal within a third predetermined time when the operation is not performed in response to said ringing tone within said second predetermined time and for causing said second control means, when the voice signal is detected, to select said automatic telephone answering/recording mode at a next occurrence of the receipt of the ring signal and for selecting said facsimile mode when the voice signal is not detected.

8. The facsimile apparatus as set forth in claim 7, wherein said ringing tone producing means continues to produce the ringing tone even after the telephone line closing means closes the telephone line.

9. The facsimile apparatus as set forth in claim 8, wherein ringing tone stopping means is provided for stopping said ringing tone when one of the facsimile mode, the telephone conversation mode and the automatic telephone answering/recording mode is selected by said first control means or said second control means.

10. The facsimile apparatus as set forth in claim 7, wherein said third control means comprises means when the voice signal is detected within said third predetermined time for selecting said automatic telephone answering/recording mode, for recording a received voice signal, and for establishing an absence operation mode wherein, upon said next occurrence of the receipt of the ring signal and when said start signal detecting means does not detect said facsimile communication start signal within the first predetermined time, said second control means selects said automatic telephone answering/recording mode for recording the received voice signal.

11. A facsimile apparatus comprising:

telephone line closing means for closing a telephone line in response to receipt of a ring signal;

ringing tone producing means for producing a ringing tone in response to the receipt of the ring signal;

facsimile communication means;

facsimile communication start signal detecting means for detecting a facsimile communication start signal sent through the telephone line;

automatic telephone answering/recording means for sending an outgoing voice message to the telephone line and for recording an incoming voice signal received through the telephone line;

first control means for selecting a facsimile mode to operate said facsimile communication means when said facsimile communication start signal detecting means detects said facsimile communication start signal within a first predetermined time after said telephone line closing means closes the telephone line;

second control means for selecting a telephone conversation mode when an operation in response to said ringing tone is performed within a second predetermined time after the receipt of said ring signal and for selecting an automatic telephone answering/recording mode to operate said automatic telephone answering/recording means when the operation is not performed in response to said ringing tone within said second predetermined time, said second control means performing said selection between said telephone conversation mode and said automatic telephone answering/recording mode when said facsimile mode is not selected by said first control means;

third control means operating when the operation is not performed in response to said ringing tone within said second predetermined time and when a voice signal is detected within a third predetermined time during said automatic telephone answering/recording mode to establish an absence mode of operation wherein, upon a next occurrence of the receipt of the ring signal when said facsimile communication start signal detecting means does not detect said facsimile communication start signal, said automatic telephone answering/recording means sends the outgoing voice message to the telephone line and records the incoming voice signal received through the telephone line; and fourth control means for selecting said facsimile mode when the voice signal is not detected within said third predetermined time during said automatic telephone answering/recording mode being selected.

12. The facsimile apparatus as set forth in claim 11, wherein said ringing tone producing means continues to produce the ringing tone even after the telephone line closing means closes the telephone line.

13. The facsimile apparatus as set forth in claim 12, wherein ringing tone stopping means is provided for stopping said ringing tone when one of the facsimile mode, the telephone conversation mode and the automatic telephone answering/recording mode is selected by said first control means or said second control means.

14. A facsimile apparatus comprising:

telephone line closing means for closing a telephone line in response to receipt of a ring signal;

ringing tone producing means for producing a ringing tone in response to the receipt of the ring signal;

facsimile communication means;

facsimile communication start signal detecting means for detecting a facsimile communication start signal sent through the telephone line;

automatic telephone answering/recording means for sending an outgoing voice message to the telephone line and for recording an incoming voice signal received through the telephone line;

operation mode setting means for designating at least a presence operation mode or an absence operation mode;

first control means for selecting a telephone conversation mode when an operation in response to said ringing tone is performed within a first predetermined time after the receipt of said ring signal and for selecting an automatic telephone answering/recording mode to operate said automatic telephone answering/recording means when the operation is not performed in response to said ringing tone within said first predetermined time;

second control means for changing the mode designation of said operation mode setting means from said presence operation mode to said absence operation mode for a next occurrence of receipt of the ring signal when a voice signal is detected within a second predetermined time during said automatic telephone answering/recording mode being selected; and third control means for selecting a facsimile mode to operate said facsimile communication means when said facsimile communication start signal detecting means detects said facsimile communication start signal within a third predetermined time after said telephone line closing means closes the telephone line and for selecting said automatic telephone answering/recording mode when said facsimile communication start signal detecting means does not detect said facsimile communication start signal within said third predetermined time, said third control means performing said selection between said facsimile mode and said automatic telephone answering/recording mode when the mode designation of the operation mode setting means is set to said absence operation mode.

15. The facsimile apparatus as set forth in claim 14, wherein said ringing tone producing means continues to produce the ringing tone even after the telephone line closing means closes the telephone line.

16. The facsimile apparatus as set forth in claim 15, wherein ringing tone stopping means is provided for stopping said ringing tone when one of the telephone conversation mode and the automatic telephone answering/recording mode is selected by said first control means.

17. A facsimile apparatus comprising:

telephone line closing means for closing a telephone line in response to receipt of a ring signal from a calling party;

ringing tone producing means for producing a ringing tone in response to the receipt of the ring signal; and control means for performing selection among at least a facsimile mode which allows a facsimile communication through the telephone line, a telephone conversation mode which allows a telephone conversation through the telephone line and an automatic telephone answering/recording mode which allows an outgoing voice message to be reproduced for sending through the telephone line and further allows an incoming voice message sent through the telephone line to be recorded, said control means comprising:

first means for determining whether a facsimile communication start signal is received within a first predetermined time after said telephone line closing means closes the telephone line;

second means for selecting said facsimile mode when said first means determines that said facsimile communication start signal is received within said first predetermined time;

third means for determining, when said first means determines that said facsimile communication start signal is not received within said first predetermined time, whether a called party performs an operation in response to the ringing tone within a second predetermined time;

fourth means for selecting said telephone conversation mode when said third means determines that the called party performs said operation within said second predetermined time and for selecting said automatic telephone answering/recording mode when said third means determines that the called party does not perform the operation within said second predetermined time;

fifth means for determining, when said third means determines that the called party does not perform the operation within said second predetermined time, whether a voice signal from the calling party is received within a third predetermined time; and sixth means for selecting said facsimile mode when said fifth means determines that the voice signal is not received within said third predetermined time.

18. The facsimile apparatus as set forth in claim 17, wherein said fourth means selects said automatic telephone answering/recording mode only when said fifth means determines that the voice signal is received within said third predetermined time.

19. The facsimile apparatus as set forth in claim 17, wherein said fifth means makes said determination during said automatic telephone answering/recording mode being selected by said fourth means.

20. A facsimile apparatus comprising:

telephone line closing means for closing a telephone line in response to receipt of a ring signal from a calling party;

ringing tone producing means for producing a ringing tone in response to the receipt of the ring signal;

operation mode setting means for designating at least a presence operation mode where a called party is available or an absence operation mode where the called party is non-available; and control means for performing selection, during said presence operation mode being designated, among at least a facsimile mode which allows a facsimile communication through the telephone line, a telephone conversation mode which allows a telephone conversation through the telephone line and an automatic telephone answering/recording mode which allows an outgoing voice message to be reproduced for sending through the telephone line and further allows an incoming voice message sent through the telephone line to be recorded, said control means comprising:

first means for determining whether a facsimile communication start signal is received within a first predetermined time after said telephone line closing means closes the telephone line;

second means for selecting said facsimile mode when said first means determines that said facsimile communication start signal is received within said first predetermined time;

third means for determining, when said first means determines that said facsimile communication start signal is not received within said first predetermined time, whether a called party performs an operation in response to the ringing tone within a second predetermined time;

fourth means for selecting said telephone conversation mode when said third means determines that the called party performs said operation within said second predetermined time and for selecting said automatic telephone answering/recording mode when said third means determines that the called does not party perform the operation within said second predetermined time;

fifth means for determining, when said third means determines that the called does not party perform the operation within said second predetermined time, whether a voice signal from the calling party is received within a third predetermined time;

sixth means for selecting said facsimile mode when said fifth means determines that the voice signal is not received within said third predetermined time; and seventh means for changing the mode designation of said operation mode setting means from said presence operation mode to said absence operation mode for a next occurrence of the receipt of the ring signal when said fifth means determines that the voice signal is received within said third predetermined time.

21. The facsimile apparatus as set forth in claim 20, wherein said fourth means selects said automatic telephone answering/recording mode only when said fifth means determines that the voice signal is received within said third predetermined time.

22. The facsimile apparatus as set forth in claim 20, wherein said fifth means makes said determination during said automatic telephone answering/recording mode being selected by said fourth means.

23. A facsimile apparatus comprising:

telephone line closing means for closing a telephone line in response to receipt of a ring signal;

ringing tone producing means for producing a ringing tone in response to the receipt of the ring signal;

facsimile communication means;

facsimile communication start signal detecting means for detecting a facsimile communication start signal sent through the telephone line;

automatic telephone answering/recording means for sending an outgoing voice message to the telephone line and for recording an incoming voice signal received through the telephone line;

first control means for selecting a facsimile mode to operate said facsimile communication means when said facsimile communication start signal detecting means detects said facsimile communication start signal within a first predetermined time after said telephone line closing means closes the telephone line;

second control means for selecting a telephone conversation mode when an operation in response to said ringing tone is performed within a second predetermined time after the receipt of said ring signal and for selecting an automatic telephone answering/recording mode to operate said automatic telephone answering/recording means when the operation is not performed in response to said ringing tone within said second predetermined time, said second control means performing said selection between said telephone conversation mode and said automatic telephone answering/recording mode when said facsimile mode is not selected by said first control means; and third control means for detecting a voice signal within a third predetermined time when the operation is not performed in response to said ringing tone within said second predetermined time and for selecting said facsimile mode when the voice signal is not detected, said third control means operating when the voice signal is detected within the third predetermined time for selecting said automatic telephone answering/recording mode and for establishing an absence operation mode wherein, upon a next occurrence of receipt of the ring signal and when said start signal detecting means does not detect said facsimile communication start signal within the first predetermined time, said automatic telephone answering/recording means sends the outgoing voice message to the telephone line and records the incoming voice signal received through the telephone line.

* * * * *